US010209906B2

(12) United States Patent
Tamma et al.

(10) Patent No.: US 10,209,906 B2
(45) Date of Patent: Feb. 19, 2019

(54) TARGET PORT PROCESSING OF A DATA TRANSFER

(71) Applicant: HEWLETT PACKARD ENTERPRISE DEVELOPMENT LP, Houston, TX (US)

(72) Inventors: Roopesh Kumar Tamma, Fremont, CA (US); Siamak Nazari, Fremont, CA (US); Ajitkumar A. Natarajan, Fremont, CA (US)

(73) Assignee: Hewlett Packard Enterprises Development LP, Houston, TX (US)

(*) Notice: Subject to any disclaimer, the term of this patent is extended or adjusted under 35 U.S.C. 154(b) by 0 days.

(21) Appl. No.: 15/033,189

(22) PCT Filed: Oct. 31, 2013

(86) PCT No.: PCT/US2013/067787
§ 371 (c)(1),
(2) Date: Apr. 29, 2016

(87) PCT Pub. No.: WO2015/065436
PCT Pub. Date: May 7, 2015

(65) Prior Publication Data
US 2016/0253115 A1 Sep. 1, 2016

(51) Int. Cl.
G06F 13/36 (2006.01)
G06F 15/167 (2006.01)
(Continued)

(52) U.S. Cl.
CPC ............ *G06F 3/0619* (2013.01); *G06F 3/061* (2013.01); *G06F 3/067* (2013.01); *G06F 3/0631* (2013.01);
(Continued)

(58) Field of Classification Search
None
See application file for complete search history.

(56) References Cited

U.S. PATENT DOCUMENTS 6,353,874 B1   3/2002   Morein
7,328,307 B2   2/2008   Hoogterp
(Continued)

FOREIGN PATENT DOCUMENTS

CN   101923443       12/2010
WO   WO-2015065436   5/2015

OTHER PUBLICATIONS

International Preliminary Report on Patentability received in PCT Application No. PCT/US2013/067787, dated May 12, 2016, 9 pages.
(Continued)

*Primary Examiner* — Hyun Nam
(74) *Attorney, Agent, or Firm* — Trop, Pruner & Hu, P.C.

(57) ABSTRACT

A technique includes receiving a command in a target port, where the command is provided by an initiator and is associated with a write operation. The technique includes, in response to the command, using the target to process a data transfer for the initiator associated with the write operation. The processing includes, based on a characteristic of the command, selectively using memory for the transfer pre-allocated by a storage array controller prior to receipt of the command by the target port or requesting an allocation of memory for the transfer from the storage array controller.

20 Claims, 3 Drawing Sheets

(51) Int. Cl.
*G06F 3/06* (2006.01)
*G06F 12/0811* (2016.01)
*G06F 13/28* (2006.01)

(52) U.S. Cl.
CPC .......... *G06F 3/0659* (2013.01); *G06F 3/0685* (2013.01); *G06F 12/0811* (2013.01); *G06F 13/28* (2013.01); *G06F 2212/283* (2013.01)

(56) References Cited

U.S. PATENT DOCUMENTS

| | | | |
|---|---|---|---|
| 7,613,785 B2 | 11/2009 | Chen | |
| 7,631,148 B2 | 12/2009 | Fair | |
| 7,752,386 B1 | 7/2010 | Aral et al. | |
| 7,809,693 B2 | 10/2010 | Lango et al. | |
| 7,864,758 B1 | 1/2011 | Lolayekar | |
| 7,917,539 B1 | 3/2011 | Srinivasan | |
| 7,934,023 B2 | 4/2011 | Basavaiah | |
| 9,977,730 B2* | 5/2018 | Herzi | G06F 12/023 |
| 2002/0010812 A1 | 1/2002 | Hoese et al. | |
| 2007/0208821 A1* | 9/2007 | Pittman | G06F 3/0611 709/213 |
| 2008/0235415 A1 | 9/2008 | Clark et al. | |
| 2010/0100679 A1 | 4/2010 | Balasubramanian et al. | |
| 2011/0004732 A1* | 1/2011 | Krakirian | G06F 12/0817 711/147 |
| 2011/0035459 A1 | 2/2011 | Desai et al. | |
| 2011/0072197 A1 | 3/2011 | Lund et al. | |
| 2011/0131379 A1 | 6/2011 | Jain et al. | |
| 2011/0289252 A1 | 11/2011 | Hoese et al. | |
| 2012/0075930 A1 | 3/2012 | Patapoutian et al. | |
| 2012/0089854 A1 | 4/2012 | Breakstone et al. | |
| 2012/0110222 A1 | 5/2012 | Dang | |
| 2012/0297043 A1 | 11/2012 | Davis et al. | |
| 2013/0151646 A1 | 6/2013 | Chidambaram et al. | |
| 2014/0089582 A1* | 3/2014 | Kobayashi | G06F 3/0614 711/114 |
| 2014/0281057 A1 | 9/2014 | Cohen et al. | |

OTHER PUBLICATIONS

International Search Report & Written Opinion received in PCT Application No. PCT/US2013/067787, dated Jul. 25, 2014, 13 pages.

McData's Multi-Protocol SAN Technology, (Research Paper); Mar. 31, 2004; http://storusint.com/pdf/mcdatadocs/wp_fcip_integration_470.pdf, 12 pp.

Chris Siebenmann, "Understanding the iSCSI protocol for performance tuning," Apr. 29, 2011, <https://utcc.utoronto.ca/~cks/space/blog/tech/UnderstandingiSCSIProtocol.>.

European Patent Office, "Extended European Search Report," dated Jun. 8, 2017, issued in European Patent Application No. 13896830.0.

Nixon, Bob; "First Burst Simplification"; Jul. 16, 2003; 3 pages.

International Preliminary Report on Patentability received in PCT Application No. PCT/US2014/018073, dated Sep. 9, 2016, 6 pages.

International Search Report & Written Opinion received in PCT Application No. PCT/US2014/018073, dated Nov. 24, 2014, 9 pages.

* cited by examiner

TARGET PORT PROCESSING OF A DATA TRANSFER

BACKGROUND

A computer may access a storage area network (SAN) for purposes of storing and retrieving large amounts of data. The typical SAN includes a consolidated pool of mass storage devices (magnetic tape drives, hard drives, optical drives, and so forth), and the SAN typically provides relatively high speed block level storage, which may be advantageous for backup applications, archival applications, database applications and other such purposes.

DETAILED DESCRIPTION

Figure 1:
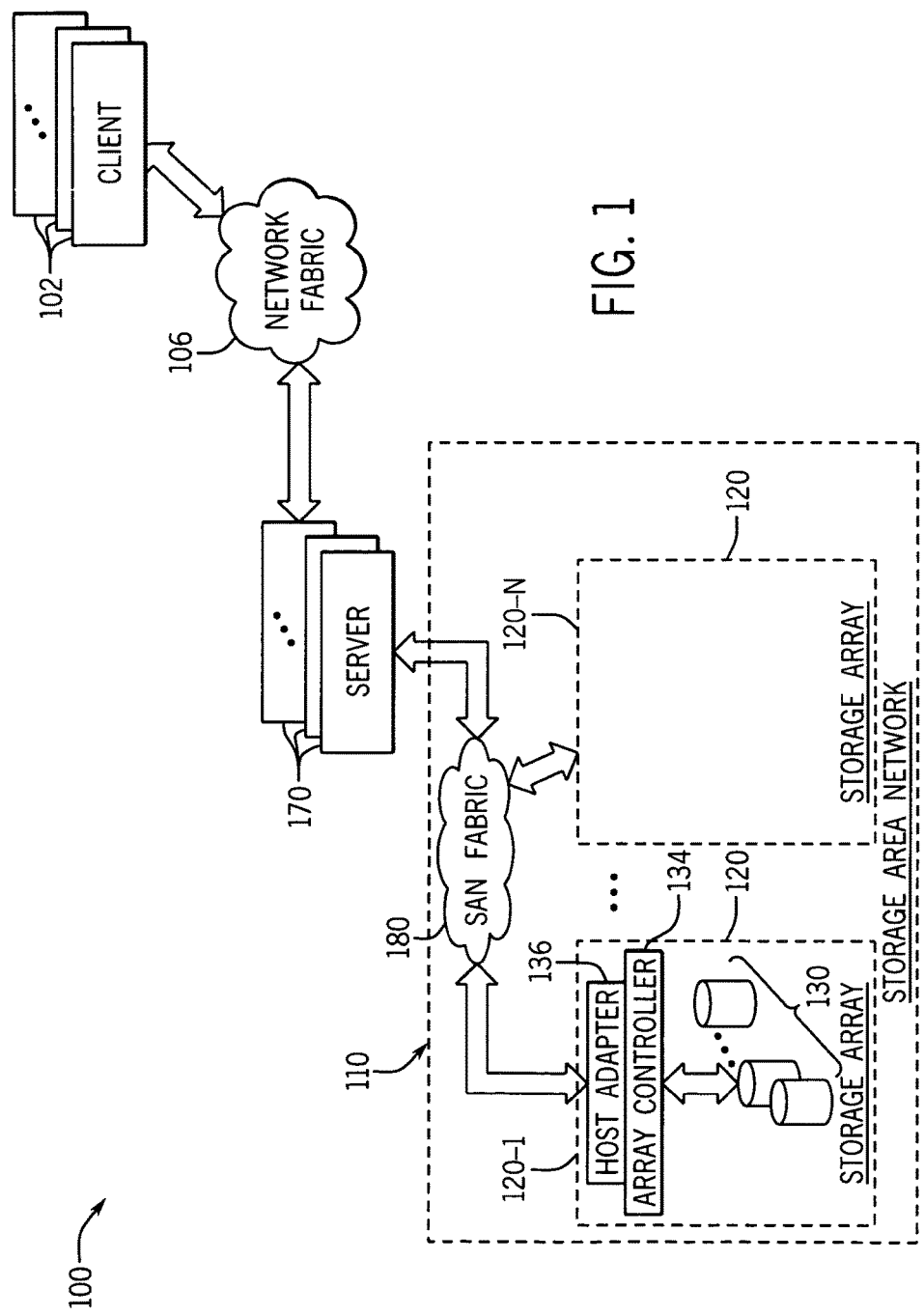
FIG. 1 is a schematic diagram of a computer system according to an example implementation.

Referring to FIG. 1, in accordance with example implementations, a computer system 100 includes a storage area network (SAN) 110, which contains a consolidated pool of physical media storage devices 130 (magnetic tape drives, optical drives, hard disk drives, combinations of these devices, and so forth), which may be used by clients 102 (desktop computers, portable computers, tablet computers, smartphones, and so forth) for data storage and retrieval purposes.

As an example, the clients 102 may communicate with various servers 170 (databases, email servers, file servers, and so forth) of the computer system 100, and as a result of these communications, the servers 170 may generate block-level access requests to store and retrieve data to and from the SAN 110. For the example of FIG. 1, the clients 102 may communicate with the servers 170 using network fabric 106, such as local area network (LAN)-based fabric, wide area network (WAN)-based fabric, Internet-based fabric, and so forth.

In general, the block-level reads and writes that are generated by the servers 170 are processed by storage array controllers 134 of storage arrays 120 (N storage arrays 120-1 ... 120-N, being depicted in FIG. 1) of the SAN 110 for purposes of storing the data in and retrieving data from physical storage devices 130 of the arrays 120.

As depicted in FIG. 1, the servers 170 are coupled to the storage arrays 120 by SAN fabric 180, which may, as examples, contain fibre channel (FC) fabric, Internet Protocol (IP)-based fabric, switches, gateways, FC-to-SCSI bridges, and so forth, as can be appreciated by the skilled artisan.

In accordance with example implementations that are disclosed herein, the servers 170 communicate with the storage arrays 120 using a messaging protocol that complies with a Fibre Channel Protocol (FCP) or an internet Small Computer Systems Interface (iSCSI) protocol; and more specifically, a server 170 may initiate a given read or write operation by providing a message that targets a specific host adaptor port.

In general, in accordance with example implementations, a given storage array 120 contains one or multiple host adapters 136. The host adapter 136 provides a front end interface that is constructed to communicate with the servers 170 and present the storage on the drives 130 of the storage array 120 as logical units. The storage array 120 further includes a storage array controller 134 that, among its other functions, performs logical-to-physical storage unit conversions and provides a back-end interface to communicate with the associated drives 130 of the storage array 120.

In the context of the following discussion, for a given write or read that transfers data between a server 170 and a storage array 120, an "initiator" (a host port of a server 170, for example) initiates the write or read operation with a given "target" port (a port of the host adaptor 136, for example) by providing a message that identifies the target port, contains a write/read command and specifies one or multiple characteristics of the associated write/read operation. The message may be an information unit (IU) (for FCP) or a protocol data unit (PDU) for (iSCSI protocol).

A given target and initiator may undergo a login process that sets up how data transfers occur between the two entities. For example, as a result of the login process, a given target port may be designated as being capable to receive unsolicited data (or "immediate" data) that accompanies a write command in a message from the initiator.

Alternatively, the login process may result in designating a target port to not receive unsolicited data with a write command. For this latter configuration, the target port controls the timing of when the initiator provides the data associated with the write in that the initiator does not provide the write data until the target port responds with a message indicating the target port's readiness to receive the write data. This may otherwise be referred to as the target port providing an XFR_RDY (for FCP) or R2T (for iSCSI protocol) signal.

Turning now to a more specific example, an initiator may generate a message that contains a write command that targets a specific port of a host adapter 136. For this example, and other examples described herein, the target port is configured to not receive unsolicited data with a write command. Instead, for a write operation, the initiator waits for the target port to provide an indication of readiness to receive the write data before the initiator provides the data to the target port.

When a target port receives data as part of a write operation, the target port transfers the data into a region of main memory of the storage array controller 134, which the storage array controller 134 allocates for this purpose. At any one time, the main memory of the storage array controller 134 may be allocated to receive data from multiple ongoing write operations.

One way to handle the processing of a write command that is received at a target port is for the storage array controller to be directly involved in the data transfer phase of the write operation. In this approach, the storage array controller controls when the target port asserts (to the initiator) its readiness to receive the write data. Moreover, the storage array controller allocates regions of its main memory for receiving write data among the target ports as write commands are received and as memory becomes available.

More specifically, in the direct approach, in response to receiving a write command, the target port first notifies (via an interrupt, for example) the storage array controller about the command. The storage array controller then allocates part of its main memory to receive the associated write data and informs the target port about the allocation. After receiving the memory allocation, the target port responds to the initiator with an indication of readiness (i.e., the target port provides a message with the XFR_RDY or R2T signal), and the initiator responds by transferring the data to the target port.

SCSI write transactions may be handled in a way to reduce the number of interrupts per transaction on the target and improve CPU utilization and latency. One technique to reduce the number of interrupts per transaction on the target (and reduce the latency of SCSI write requests) is a SCSI standard-based "first burst" technique in which the target receives a burst of unsolicited data with the write command. The first burst feature is set up by the initiator and target negotiating the first burst feature in a login process, so that when the target is configured to receive first bursts, the target uses pre-allocated buffers. Therefore, when the initiator sends a write command, the write command is accompanied with write data, and the target uses the pre-allocated buffers to store the data before interrupting the array controller. However, the initiator may not be constructed or configured to implement first bursts.

In accordance with example techniques that are disclosed herein, buffers on the target host bus adapter are pre-allocated for non-first burst write transactions, which also allows a reduction in the number of interrupts without initiator involvement and does not depend on the ability of the initiator to support first bursts.

In this manner, systems and techniques are disclosed herein to optimize writes (optimize SCSI writes, for example) by pre-allocating memory for the transfer of the associated write data between an initiator and a target port. In this context, "pre-allocated" memory refers to one or more multiple regions of the storage array controller's memory that are allocated by the controller for exclusive use by a given port for future write operations. The pre-allocation means that the storage array controller 134 is not directly involved in the data phases of certain write operations. In this manner, in accordance with example implementations that are disclosed herein, a given target port is constructed to, for a certain write operation, communicate with an initiator to transfer write data to the target port and store the data in a pre-allocated memory region of the storage array controller 134, all without involvement by the storage array controller 134. Therefore, among possible advantages, overhead may be offloaded from the storage array controller 134 to the target port, and times associated with the transfer of write data may be decreased.

More specifically, in accordance with example implementations, the storage array controller 134 programs a given port of the host adaptor 136 with one or multiple parameters that characterize a class of write operations whose data transfers are handled by the port using pre-allocated memory. For use by the port for qualifying write operations, the array controller 134 pre-allocates one or more memory buffers to the given port.

In accordance with example implementations, a given port has exclusive access to its allocated memory buffer(s) for the designated class of writes until the port releases the allocated memory buffers back to the storage array controller 134. If a given write command does not fall within the designated class, then the storage array controller 134 is directly involved in the data phase: the target port alerts the storage array controller 134 to receipt of the command; and the target port waits for the storage array controller 134 to allocate memory for the transfer of the associated write data before the target port sends a message to the initiator indicating readiness to receive the write data.

Figure 3:
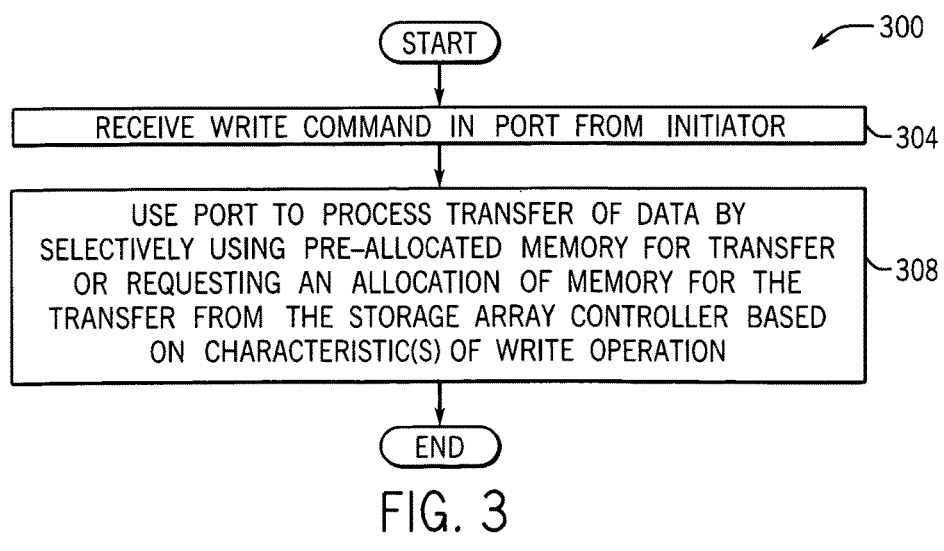
FIGS. 3 and 4 are flow diagrams depicting target port processing of a command according to example implementations.

Thus, referring to FIG. 3, in accordance with example implementations, a technique 300 includes receiving (block 304) a write command in a port from an initiator. Pursuant to block 308 of the technique 300, the port processes the transfer of the data associated with the write operation by selectively using pre-allocated memory for the transfer or requesting an allocation of memory for the data transfer from the storage array controller based on one or more characteristics of the write operation (as described by the write command).

Figure 2:
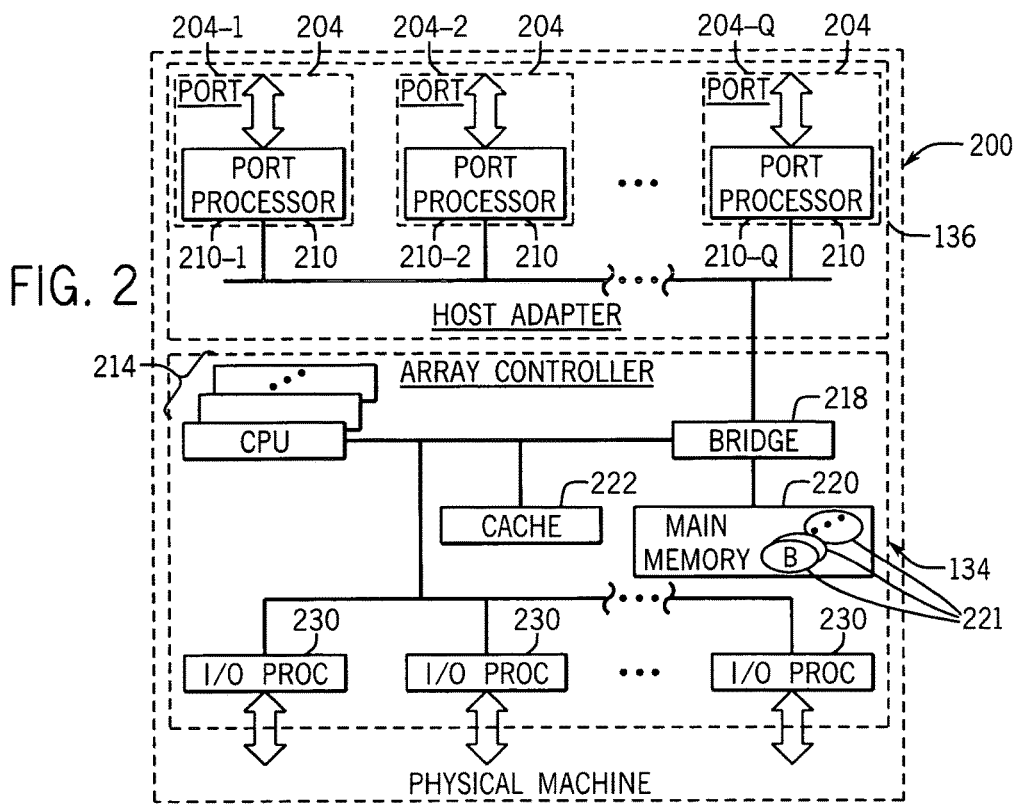
FIG. 2 is a schematic diagram of a physical machine of FIG. 1, which contains a host adaptor and a storage array controller according to an example implementation.

Referring to FIG. 2 in conjunction with FIG. 1, in accordance with example implementations, the host adaptor 136 and the storage array controller 134 may be part of the same physical machine 200. In this context, the physical machine 200 is an actual machine that is formed from actual hardware (central processing units (CPUs), memory devices, bus interfaces, and the like) and actual machine executable instructions, or "software" (operating system instructions, driver instructions, application instructions, and the like).

As an example, the storage array controller 134 may be formed from a main system board of the physical machine 200, and the host adaptor 136 may be formed by a host adaptor card that is inserted into a corresponding bus slot on the motherboard. In further implementations, the storage array controller 134 and the host adaptor 136 may be implemented further on the same motherboard. Thus, many variations are contemplated, which are within the scope of the appended claims.

As depicted in FIG. 2, in general, the host adaptor 136 may contain one or multiple port processors (Q port processors 210-1 . . . 210-Q, being depicted in FIG. 2) that form respective target ports 204 (Q target ports 204-1 . . . 204-Q, being depicted in FIG. 2 as examples). In some example implementations, a given port processor 210 is configured to process read and write operations for an assigned target port 204; and in further example implementations, a given port processor 210 may process read and write operations for multiple assigned target ports 204. As part of this processing, the port processors 210 handle data transfers associated with write commands within a predefined class using pre-allocated memory buffers, as described herein.

More specifically, in accordance with example implementations, the storage array controller 134 includes one or multiple central processing units (CPUs) 214, which are coupled to a main memory 220 of the storage array controller 134 via a bridge 218.

In general, the main memory 220 may temporarily store instructions associated with the execution of machine executable instructions, as well as data involved in the preliminary, intermediate and final results associated with this processing. In accordance with some implementations, the main memory 220 may store machine executable instructions that when executed by the CPU(s) 214 cause the CPU(s) 214 to perform all or part of the techniques that are disclosed herein, such as the techniques 300 and 400 (described below).

In general, the main memory 220 is a non-transitory storage medium that may be formed from semiconductor storage devices, optical storage devices, magnetic media-based storage devices, removable media devices, and so forth, depending on the particular implementation.

In accordance with example implementations, regions of the main memory 220 are allocated to receive incoming write data. More specifically, in accordance with example implementations, the memory 220 contains buffers 221 that receive incoming write data. The buffers 221 are designated regions of the main memory 220. The buffers 221 may each have the same length, or size; or the buffers 221 may have different sizes, depending on the particular implementation.

When a port processor 210 receives write data for an associated write operation, the port processor 210 performs a direct memory access (DMA) to the main memory 220 for purposes of storing the write data in the allocated buffer(s) 221. After the data has been transferred, the CPU(s) 214 may perform such functions as logical-to-physical data unit conversions and store the data in one or more of the storage devices 130 via one or multiple input/output (I/O) processors 230. The allocated buffer(s) 221 for a given write command may be pre-allocated before receipt of the write command or may be allocated after receipt of the write command, depending on whether the associated write falls within the qualifying, or designated, class.

In accordance with example implementations, the CPU(s) 214 identify a qualifying, or designated class of write operations to be handled by a given port processor 210 for a given port 204 and programs the port processor 210 accordingly. In this regard, the CPU(s) 214 may program a given port processor 210 with one or multiple parameters that describe the class of write operations, as well as program the port processor 210 with a pre-allocated pool of one or multiple buffers 221 to be used in the transfer of the write data to the main memory 220. In accordance with example implementations, the pre-allocated buffer(s) 221 are used exclusively by the assigned port 204.

The designated class of write operations to be handled by a given port 204 are defined by one or multiple parameters that describe one or multiple characteristics of the write operations to be covered. For example, in accordance with some implementations, a given write operation class includes write commands that are associated with a given block length, or size, of write data. In this manner, the block size may be related to a cache line size of a cache memory 222 of the storage array controller 134. For example, a given cache size may be thirty two kilobytes (kB).

In accordance with further example implementations, the port processor 210 may take into account considerations other than the block size of the write data. For example, in accordance with some example implementations, given write operation may be associated with a data offset. The class of write operations may be write operations in which the offset does not cause the write data to be stored in more than one cache line.

For example, the block size of a given write operation may be equal to the cache line size. Therefore, in accordance with an example implementation, an offset of ten may cause two cache lines to be used and therefore, may not be considered part of the write class. As such, the storage array controller 134 handles the initial stages of such a write operation by first allocating the buffer(s) 221 to the port processor 210, and then the port processor 210 signals its readiness to the initiator.

Figure 4:
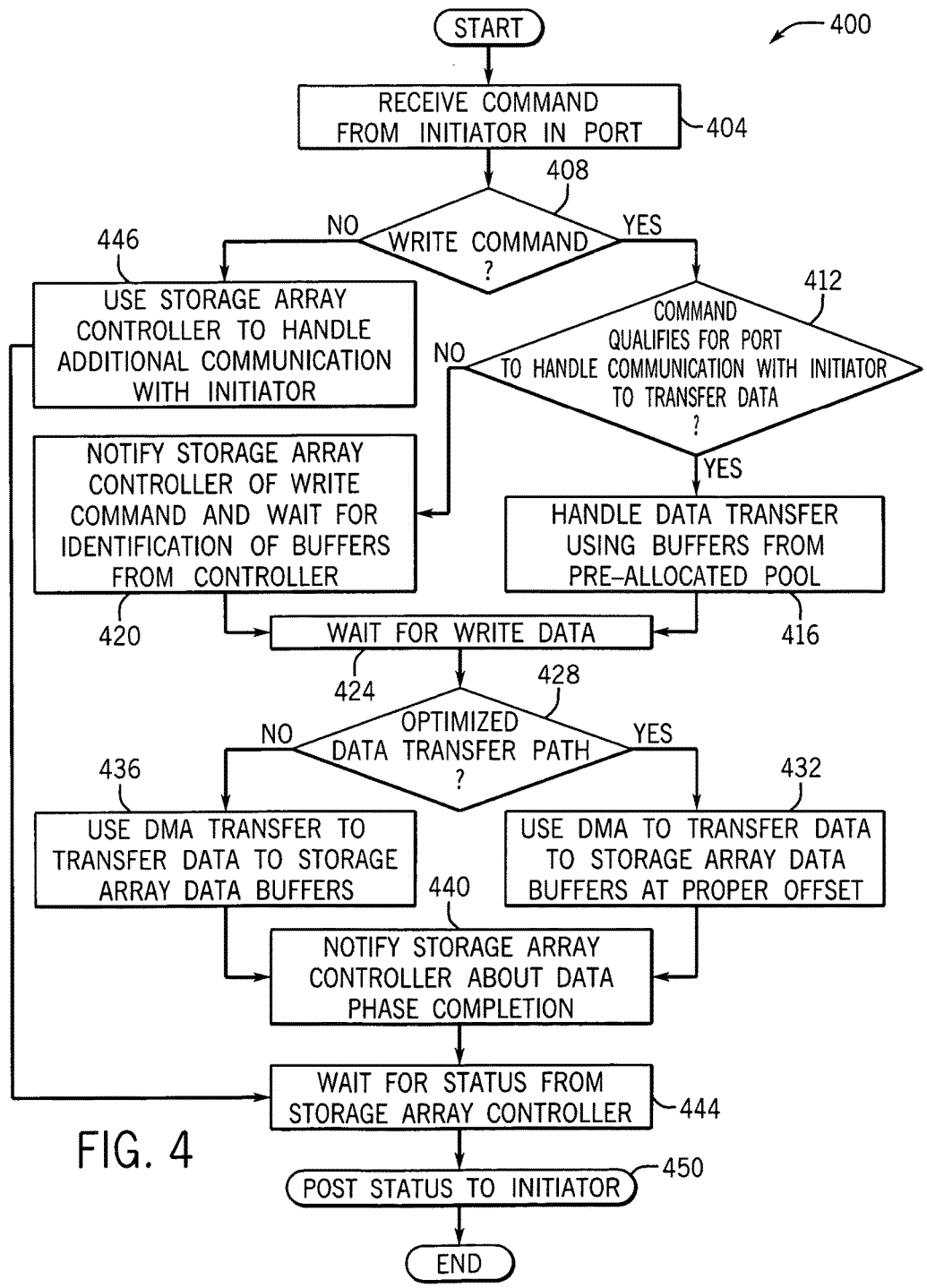

Referring to FIG. 4, as a more specific example, in accordance with example implementations, a write command may be processed by the storage array 120 pursuant to a technique 400. The technique 400 includes the target port receiving (block 404) a command from an initiator. If the target port determines (decision block 408) that the command is a write command, then the target port determines (decision block 412) whether the write command qualifies for the port to handle communication with the initiator to transfer the data using pre-allocated memory. If so, the target port uses (block 416) buffers from its pre-allocated pool to handle the transfer and indicates its readiness to the initiator, pursuant to block 416. If, however, the write command does not qualify (decision block 412), the port forwards (block 420) the request to the storage array controller, waits for the identification of the memory buffer(s) from the controller and then indicates readiness of the port to receive the data. As depicted in FIG. 4, after indicating its readiness to the initiator, the target port waits (block 424) for the write data.

As indicated by decision block 428, the transfer of the data to the memory of the storage array controller depends on whether the write is within the class to be handled using pre-allocated memory. In this manner, if the write is a qualified write, the target port uses DMA to transfer the data to the pre-allocated memory of the storage array controller at the proper offset, pursuant to block 432. Otherwise, the target port uses DMA transfer to transfer the data to the storage array buffers allocated after receipt of the write command, pursuant to block 436.

At the conclusion of the data transfer, the target port notifies (block 440) the storage array controller about the data phase completion. The target port then waits (block 444) for the status from the storage array controller and posts (block 450) the status to the initiator, pursuant to block 450.

As depicted in FIG. 4, if the command is not a write command (decision block 408), the port uses the storage array controller to regulate the additional processing phases with the initiator, pursuant to block 446; and control proceeds to block 444.

Among the potential advantages of the techniques and systems that are disclosed herein, write operation performance may be improved without the need for the initiator to modify its standard behavior. Configuration is under the full control of the storage array. The storage array controller may experience a significant reduction in interrupt processing, and the storage array controller may experience a significant decrease in its CPU loading. The systems and techniques are disclosed herein may be especially beneficial for storage arrays that have a relatively high target port density. Other and different advantages are contemplated, which are within the scope of the appended claims.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
receiving a write command in a target port, the command being provided by an initiator;
in response to receiving the command, using the target port to process a data transfer for the initiator, wherein the processing includes, based on a characteristic of the command, selectively using memory for the transfer pre-allocated by a storage array controller prior to receipt of the command by the target port or requesting an allocation of memory for the transfer from the storage array controller; and
using the storage array controller to program the target port with at least one parameter indicative of the characteristic, wherein the programmed parameter characterizes a class of write operations, and further comprising, depending on whether the write command is within the class of write operations characterized by the programmed parameter, transferring data of the data transfer to the memory pre-allocated by the storage array controller prior to receipt of the command by the target port, or transferring the data to memory allocated by the storage array controller after receipt of the command by the target port.

2. The method of claim 1, wherein using the target port comprises selectively using the target port to provide a ready to transfer signal to the initiator without requesting the allocation of memory for the transfer from the storage array controller.

3. The method of claim 1, wherein using the target port comprises selectively indicating readiness of the target port to receive the data without first requesting allocation of memory based at least in part on a block size associated with the data.

4. The method of claim 3, wherein using the target port comprises selectively indicating readiness of the target port to receive the data without first requesting allocation of memory based at least in part on whether the block size exceeds a line size of a cache memory used by the storage array controller.

5. The method of claim 1, wherein using the target port comprises selectively indicating readiness of the target port to receive the data without first requesting allocation of memory from the storage array controller based at least in part on whether an offset associated with the data is associated with more than one line of a cache memory used by the storage array controller.

6. The method of claim 1, wherein the at least one parameter indicates whether the data will be associated with one cache line or associated with multiple cache lines.

7. The method of claim 1, further comprising the port processor to selectively wait for an association of memory from the storage array controller after the port processor receives the command based on the characteristic of the write operation.

8. An article comprising a non-transitory computer readable storage medium to store instructions that when executed by a computer cause the computer to:
program a port processor, prior to the port receiving a write command, with at least one parameter describing at least one characteristic, wherein the programmed parameter characterizes a class of write operations, the port processor to process the write operation, and, based on a characteristic of the write operation, selectively indicate a readiness to the initiator to receive data of the write command, or transfer the data to a memory region allocated prior to receipt of the write command by the port processor; and
allocate memory for the port processor to transfer data of another write command not described by the at least one parameter after receipt of the another write command by the port processor.

9. The article of claim 8, wherein the characteristic comprises a block size associated with the data.

10. The apparatus of claim 8, wherein the at least one parameter indicates whether the data will be associated with one cache line or associated with multiple cache lines.

11. The article of claim 8, wherein the port processor is programmed with the at least one parameter by a storage array controller.

12. The article of claim 8, wherein the memory region allocated prior to receipt of the write command by the port processor is allocated by a storage array controller.

13. An apparatus comprising:
a port processor to process a write operation responsive to reception of a write command from an initiator to write data, the port processor to, depending on whether the write command is within a class of write operations characterized by a programmed parameter that characterizes the class of write operations:
provide an indication to a storage array controller of a receipt of the write command; or
transfer the data to a memory region pre-allocated before the port receives the write command; and
the storage array controller to:
program the port with the programmed parameter;
pre-allocate the memory region before the port receives the write command; and
when the port provides an indication to the storage array controller of the receipt of the write command, allocate other memory to receive the data.

14. The apparatus of claim 13, wherein the port processor is programmed with the pre-allocated memory region, the pre-allocated memory region being associated with a least one memory buffer reserved by the storage array controller for use by the port processor.

15. The apparatus of claim 13, wherein the port processor performs a direct memory access (DMA) transfer of the data to the memory region.

16. The apparatus of claim 13, wherein the port processor selectively waits for an association of memory from the storage array controller after the port processor receives the command based on the characteristic of the write operation.

17. The apparatus of claim 13, further comprising:
media storage drives coupled to the storage array controller, wherein the storage array controller stores the data in at least one of the drives.

18. The article of claim 13, wherein the at least one parameter indicates whether the data will be associated with one cache line or associated with multiple cache lines.

19. The apparatus of claim 13, wherein the characteristic comprises a block size associated with the data.

20. The apparatus of claim 13, wherein the characteristic is based at least in part on whether an offset associated with the write data is associated with more than one line of a cache memory used by a storage array controller.

* * * * *